United States Patent [19]

Aviles et al.

[11] Patent Number: 5,289,319
[45] Date of Patent: Feb. 22, 1994

[54] APPARATUS AND METHOD FOR DETECTING PHYSICAL ORIENTATION OF A POSITION SYSTEM AND FOR CALIBRATING AN OPTIMUM CONTROL FOR THE SYSTEM THAT IS USABLE IN OPTICAL DISK RECORDERS

[75] Inventors: Enrique E. Aviles; Edwin R. Childers; Alan A. Fennema; Dave P. McReynolds, all of Tucson, Ariz.

[73] Assignee: International Business Machines Corporation, Armonk, N.Y.

[21] Appl. No.: 960,034

[22] Filed: Oct. 13, 1992

[51] Int. Cl.⁵ .......................... G02B 7/02; G11B 7/00
[52] U.S. Cl. .................... 359/814; 359/823; 359/824; 369/44.21; 369/44.32
[58] Field of Search ........ 359/811, 813, 815, 819–824; 369/44.11, 44.27, 44.28, 44.14, 44.17, 44.25, 44.29, 44.32, 44.21; 360/77.04, 78.08–78.09

[56] References Cited

U.S. PATENT DOCUMENTS

5,038,333  8/1991  Chow et al. ............... 369/44.28
5,097,361  3/1992  Childers et al. .............. 359/824

Primary Examiner—Bruce Y. Arnold
Assistant Examiner—James Phan
Attorney, Agent, or Firm—H. F. Somermeyer

[57] ABSTRACT

A rotary positioner is rotatably mounted upon a reciprocating carriage of a optical disk drive. To detect and indicate one of a plurality of possible orientations of the disk drive, a side bias force is applied to the rotary positioner in a direction orthogonal to the radius of the disk drive. It has been found that each orientation has a side bias at which gravity effects are removed from the rotary positioner. At these points of gravity accommodation, certain instabilities in servo operation occur. Since each orientation requires a different side bias force to create the respective servo instabilities, the side bias force causing such instability indicates the drive orientation. Two modes of testing for orientation are disclosed. The carriage positioner is actuate for causing a momentary uncorrected radial movement of the carriage. The response of the carriage servo is measured in one of two ways. The uncorrected momentary carriage motion is detected either by detecting changes in a position error signal of either the rotary position or the carriage.

15 Claims, 4 Drawing Sheets

APPARATUS AND METHOD FOR DETECTING PHYSICAL ORIENTATION OF A POSITION SYSTEM AND FOR CALIBRATING AN OPTIMUM CONTROL FOR THE SYSTEM THAT IS USABLE IN OPTICAL DISK RECORDERS

DOCUMENTS INCORPORATED BY REFERENCE

Childers et al U.S. Pat. No. 5,097,361 is incorporated for its showing of a positioning system that may advantageously employ the present invention.

Chow et al U.S. Pat. No. 5,038,333 is incorporated for its showing of a positioning system in an optical disk apparatus having a grooved data storage member or disk and circuits that generate a position error signal termed "tracking error signal" TES.

FIELD OF THE INVENTION

The present invention relates to positioning systems that employ a rotary or pivoting member, to detecting the physical orientation of such pivoting member and to calibrate operation of the pivoting member in the positioning system. The positioning system is preferred to be used as a head or transducer positioning system in an optical disk drive.

BACKGROUND OF THE INVENTION

Optical disk recorders have often employed rotary lens holders in which the lens is axially moveable in the holder along the optical axis of the lens. Such motions enable focusing operations to occur using the objective lens. Further, the rotational mode of the lens holder enables the lens to be moved from a record track to an adjacent record track or a plurality of such record tracks by a track seek operation, as is known. Such a lens holder is usually located on a head carriage, also termed a coarse actuator in which an upstanding pin slidable and rotatably receives a lens holder. In optical disk recorders, because of extremely high track density and lineal recording densities, any tolerances between the upstanding pin and the lens holder may cause vibration and introduce an independent variable which has to be accommodated by servo circuits. In many instances, the wobbling or other action of the rotatable lens holder (also termed actuator) relative to the head or transducer carriage becomes significant at track spacings of about one micron and with a substantial linear density in which the cells are a micron or less in length along the track.

Physical orientation of the drive, hence the rotary actuator, can be either horizontal or vertical with either a right or left side being upward. It is desired to automatically ascertain the physical orientation for better controlling the rotary actuator. Once the physical orientation of the rotary actuator has been ascertained, then the control of the rotary actuator can be optimized. This determination of orientation and optimizing the control of a rotary actuator has particular utility in head arm positioning apparatus in which the rotary actuator is carried on a head arm carriage that linearly reciprocates radially of an data storing disk. Other applications may also advantageously employ the present invention.

Similar problems occur in other recorders such as so-called hard disk recorders in which the magnetic transducer is rotatably mounted for track crossings and for track seeking. As the track densities of such hard magnetic hard disks increase the sensitivity to the tolerances of the pivoting rotatable support becomes more and more critical. Accordingly, it is desired to provide a simple and efficient control of the relationship between a rotary actuator or transducer holder (also termed working tool holder) and its support whether it be on a head carriage or on a frame of a device that uses such a rotatable actuator. In particular, it is desired to calibrate the operation of the rotary actuator or working tool holder to accommodate different physical orientations of the rotary actuator.

DISCUSSION OF THE PRIOR ART

The Childers et al patent incorporated by reference, supra, shows applying a radial bias force on a rotary actuator for preventing any wobbling of the actuator with respect to its support pin. The present invention is an improvement over the above identified patent in that physical orientation is detected by automatic means and the bias force can be optimized based on a calibration procedure. Such calibration may reduce the amount of bias magnetic force for obtaining a desired mode of operation.

Imanaka U.S. Pat. No. 4,799,206 shows an anti-vibration control in a head positioner of an optical disk drive. In contrast, the present invention introduces physical perturbations in the positioning system for detecting physical orientation and for determining a desired magnetic bias force as discussed above with respect to the Childers et al patent incorporated by reference.

Matsushita et al U.S. Pat. No. 4,982,393 shows an excessive head radial velocity detection apparatus and means for stopping the head movement. In contrast, the present invention introduces physical perturbations in the positioning system for detecting physical orientation and for determining a desired magnetic bias force as discussed above with respect to the Childers et al patent incorporated by reference.

SUMMARY OF THE INVENTION

An object of the present invention is to have apparatus and methods that automatically ascertain physical orientation of a positioning system by introducing predetermined force perturbations into the positioning system and measuring the response of the system to such introduced perturbations.

In accordance with the invention, apparatus and methods automatically ascertain relative orientation of a positioning system having a rotary member rotatably mounted on a reciprocating carriage member and servo means that sense a predetermined relative position of the rotary member on said carriage member and actuates the carriage member to move for following the motions of said rotary member. A bias force is selected to radially bias said rotary member to counteract predetermined effects of gravity on rotation of said rotary member, such effects are gravitational urging the rotary member on a supporting pivot pin. Such radial urging is dependent on whether the positioning system is horizontal, vertical with the right side up or vertical with the left side up. Each orientation requires a different bias force for counteracting the respective gravitational effects. Then, means momentarily urging one of said members to move relative to the other member, preferably the carriage member is momentarily urged. In response to the momentary urging, other means sense the motion of the carriage member resulting from said momentary urging of the one member for detecting a maximal uncorrected position error. Then, means respond to detecting said maximal uncorrected position error for indicating a predetermined orientation, horizontal or vertical with right side or left side up, of the positioning system with respect to a horizontal reference plane.

The carriage member is momentarily actuated by either an impulse or step function control signal introduced into the positioning servo for the carriage member. The extent of resultant motion of the carriage member is measured by either the relative change in the rotary member's position error signal TES or the relative change in the carriage member's position error. A maximal position error by either member indicates orientation. A short motion of the carriage indicated by small amplitude position error signal, then the radial bias force on the rotary member is not counteracting gravity indicating that the orientation of the positioning system is other than the orientation indicated by the bias force.

The foregoing and other objects, features and advantages of the invention will be apparent from the following more particular description of preferred embodiments of the invention, as illustrated in the accompanying drawings.

DETAILED DESCRIPTION

Figure 1:
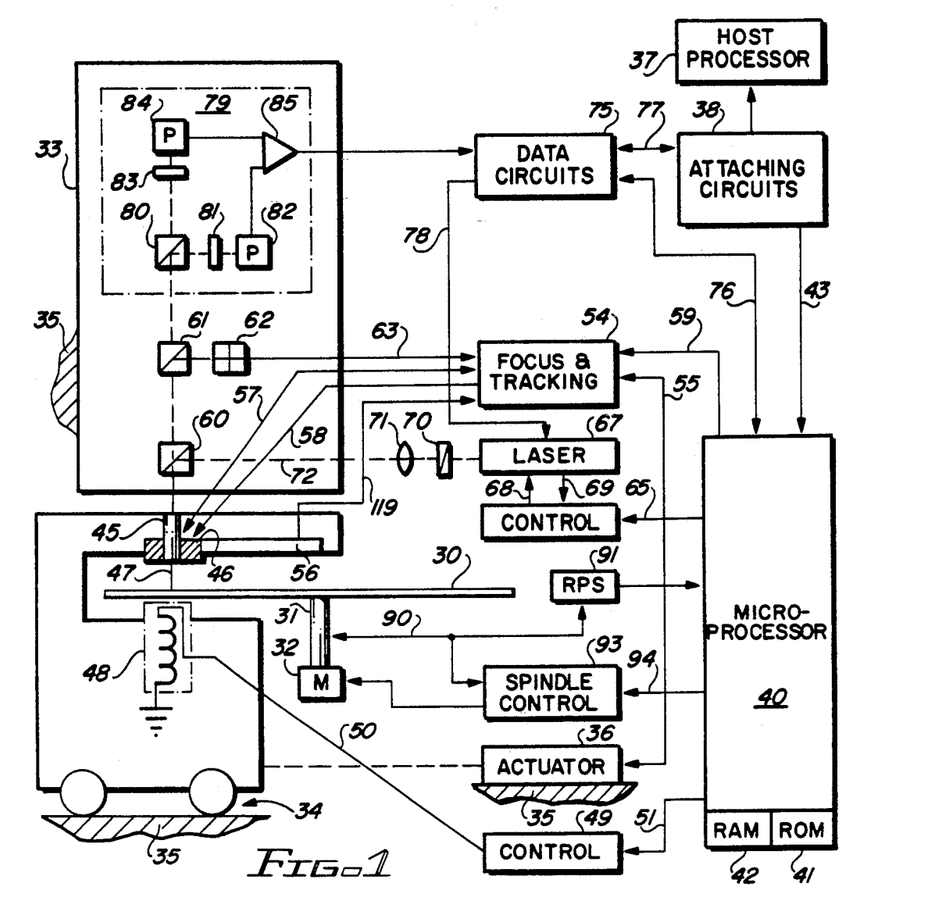
FIG. 1 is a simplified diagram showing an optical disk apparatus in which the present invention is advantageously practiced.

Referring now more particularly to the appended drawing, like numerals indicate like parts and structural features in the various figures. FIG. 1 illustrates apparatus in which the present invention is advantageously employed. A magnetooptic record disk 30 is mounted for rotation on spindle 31 by motor 32. Disk 30 has a single spiral groove on a recording surface for indicating one spiral track, as is known. Optical means 33 is mounted on frame 35. A headarm carriage 34 moves radially of disk 30 for carrying an objective lens 45 from track to track. A frame 35 of recorder suitably mounts carriage 34 for reciprocating radial motions. The radial motions of carriage 34 enable access to any one of a plurality of concentric tracks or circumventions of a spiral track for recording and recovering data on and from the disk. Linear actuator 36 suitably mounted on frame 35, radially moves carriage 34 for enabling track accessing. The recorder is suitably attached to one or more host processors 37, such host processors may be control units, personal computers, large system computers, communication systems, image signal processors, and the like. Attaching circuits 38 provide the logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43. Included in microprocessor 40 is a program or microcode-storing, read-only memory (ROM) 41 and a data and control signal storing random-access memory (RAM) 42.

The optics of the recorder include an objective or focusing lens 45 mounted for focusing and radial tracking motions on headarm 33 by fine actuator 46. This actuator includes mechanisms for moving lens 45 toward and away from disk 30 for focusing and for radial movements parallel to carriage 34 motions; for example, for changing tracks within a range of 100 tracks so that carriage 34 need not be actuated each time a track adjacent to a track currently being accessed is to be accessed. Numeral 47 denotes a two-way light path between lens 45 and disk 30.

In magnetooptic recording, magnetic bias field generating coil 48. In a constructed embodiment electromagnet provides a weak magnetic steering or bias field for directing the remnant magnetization direction of a small spot on disk 30 illuminated by laser light from lens 45. The laser light spot heats the illuminated spot on the record disk to a temperature above the Curie point of the magnetooptic layer (not shown, but can be an alloy of rare earth and transitional metals as taught by Chaudhari et al., U.S. Pat. No. 3,949,387). This heating enables magnet coil 48 generated bias field to direct the remnant magnetization to a desired direction of magnetization as the spot cools below the Curie point temperature. Magnet coil 48 is shown as supplying a bias field oriented in the "write" direction, i.e., binary ones recorded on disk 30 normally are "north pole remnant magnetization". To erase disk 30, magnet coil 48 supplies a field so the south pole is adjacent disk 30. Magnet coil 48 control 49 is electrically coupled to magnet coil 48 over line 50 to control the write and erase directions of the coil 48 generated magnetic field. Microprocessor 40 supplies control signals over line 51 to control 49 for effecting reversal of the bias field magnetic polarity.

It is necessary to control the radial position of the beam following path 47 such that a track or circumvolution is faithfully followed and that a desired track or circumvolution is quickly and precisely accessed. To this end, focus and tracking circuits 54 control both the coarse actuator 36 and fine actuator 46. The positioning of carriage 34 by actuator 36 is precisely controlled by control signals supplied by circuits 54 over line 55 to actuator 36. Additionally, the fine actuator 46 control by circuits 54 is exercised through control signals travelling to fine actuator 46 over lines 57 and 58, respectively for effecting respective focus and track following and seeking actions. IN the illustrated embodiment, actuator 46 has a rotary member on carriage 34 for track following and switching to radially close tracks, as is known. Relative position error (RPE) sensor 56 senses the relative position of fine actuator 46 to headarm carriage 33 to create a (RPE) signal. Line 57 has a conductor for carrying a focus control signal from circuits 54 to the focus mechanisms in fine actuator 46.

The focus and tracking position sensing is achieved by analyzing laser light reflected from disk 30 over path 47, thence through lens 45, through one-half mirror 60 and to be reflected by half-mirror 61 to a so-called "quad detector" 62. Quad detector 62 has four photoelements which respectively supply signals on four lines collectively denominated by numeral 63 to focus and tracking circuits 54. Aligning one axis of the detector 62 with a track center line, track following operations are enabled. Focusing operations are achieved by comparing the light intensities detected by the four photoelements in the quad detector 62. Focus and tracking circuits 54 analyze the signals on lines 63 to control both focus and tracking. Control of tracking and seeking is by using a tracking error signal TES. Such signal is well known. Further, generation of TES is described in Chow et al, supra.

Recording or writing data onto disk 30 is next described. It is assumed that magnet 48 is rotated to the desired position for recording data. Microprocessor 40 supplies a control signal over line 65 to laser control 66 for indicating that a recording operation is to ensue. This means that laser 67 is energized by control 66 to emit a high-intensity laser light beam for recording; in contrast, for reading, the laser 67 emitted laser light beam is a reduced intensity for not heating the laser illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value. Laser 67, a semiconductor laser, such as a gallium-arsenide diode laser, can be modulated by data signals so the emitted light beam represents the data to be recorded by intensity modulation. In this regard, data circuits 75 (later described) supply data indicating signals over line 78 to laser 67 for effecting such modulation. This modulated light beam passes through polarizer 70 (linearly polarizing the beam), thence through collimating lens 71 toward half mirror 60 for being reflected toward disk 30 through lens 45. Data circuits 75 are prepared for recording by the microprocessor 40 supplying suitable control signals over line 76. Microprocessor 40 in preparing circuits 75 is responding to commands for recording received from a host processor 37 via attaching circuits 38. Once data circuits 75 are prepared, data is transferred directly between host processor 37 and data circuits 75 through attaching circuits 38. Data circuits 75, also ancillary circuits (not shown), relating to disk 30 format signals, error detection and correction and the like. Circuits 75, during a read or recovery action, strip the ancillary signals from the readback signals before supply corrected data signals over bus 77 to host processor 37 via attaching circuits 38.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect) travels along the two-way light path 47, through lens 45 and half-mirrors 60 and 61 to the data detection portion 79 of the headarm 33 optics. Half-mirror or beam splitter 80 divides the reflected beam into two equal intensity beams both having the same reflected rotated linear polarization. The half-mirror 80 reflected light travels through a first polarizer 81 which is set to pass only that reflected light which was rotated when the remnant magnetization on disk 30 spot being accessed has a "north" or binary one indication. This passed light impinges on photocell 82 for supplying a suitable indicating signal to differential amplifier 85. When the reflected light was rotated by a "south" or erased pole direction remnant magnetization, then polarizer 81 passes no or very little light resulting in no active signal being supplied by photocell 82. The opposite operation occurs by polarizer 83 which passes only "south" rotated laser light beam to photocell 84. Photocell 84 supplies its signal indicating its received laser light to the second input of differential amplifier 85. The amplifier 85 supplies the resulting difference signal (data representing) to data circuits 75 for detection. The detected signals include not only data that is recorded but also all of the so-called ancillary signals as well. The term "data" as used herein is intended to include any and all information-bearing signals, preferably of the digital or discrete value type.

The rotational position and rotational speed of spindle 31 is sensed by a suitable tachometer or emitter sensor 90. Sensor 90, preferably of the optical-sensing type that senses dark and light spots on a tachometer wheel (not shown) of spindle 31, supplies the "tach" signals (digital signals) to RPS circuit 91 which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks. Additionally, the sensor 90 signals also travel to spindle speed control circuits 93 for controlling motor 32 to rotate spindle 31 at a constant rotational speed. Control 93 may include a crystal-controlled oscillator for controlling motor 32 speed, as is well known. Microprocessor 40 supplies control signals over line 94 to control 93 in the usual manner.

Figure 2:
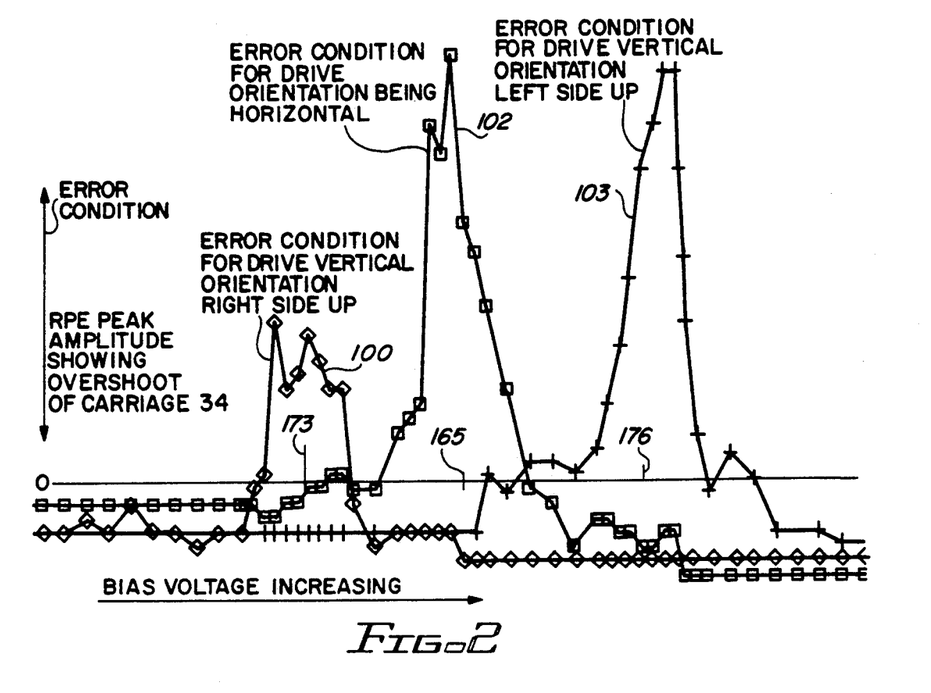
FIG. 2 is a graph showing uncorrected position errors indicating orientation of the positioning system shown in FIG. 1.

FIG. 2 is a graph illustrating an automatic device and positioning system orientation. The horizontal ordinate represents the later described bias voltage used to create a gravity counteracting bias force in fine actuator or rotary positioner 46. The vertical ordinate indicates the servo system for carriage 34 response to an impulse or momentary urging of carriage 34 at different radial bias forces on the rotary positioner 46. The FIG. 2 graph was generated by measuring the amplitude of the tracking error signal (TES) on line 63 (FIGS. 1 and 4) at the bias voltages in three orientations of the FIG. 1 illustrated apparatus resulting when the actuator 36 is actuated to momentarily move carriage 34 in an uncorrected motion error. Such momentary motion is an error because carriage 34 always follows the radial motions of rotary actuator 46. Curve 100 shows the TES signal amplitude when the FIG. 1 illustrated apparatus is oriented vertically with its right side 101 (FIGS. 1, 3 and 4)up. Similarly, curve 102 shows the TES amplitude with the FIG. 1 illustrated apparatus is oriented horizontally as shown in FIG. 1. Note that the horizontal orientation, for most optical disk drives, applies not only to the FIG. 1 illustrated orientation of disk 30 and carriage 34 but also if the illustrated apparatus are inverted, i.e. carriage 34 is over disk 30 rather than under disk 30. Curve 103 shows the TES signal amplitude when the FIG. 1 illustrated apparatus is oriented vertically with its left side 104 up. The peak amplitudes aligned respectively with hash marks 165, 173 and 176 represent the bias force on the rotary positioner counteracting gravity in the respective orientations of the FIG. 1 illustrated apparatus. Detection of the peaks provide indications of the physical orientation of the rotary positioner 46. Applying bias voltage to the rotary positioner, as shown in FIG. 3, having an amplitude represented by hash marks 173, 165 and 176 enables quick and automatic detection of physical orientation of the FIG. 1 illustrated apparatus.

Figure 3:
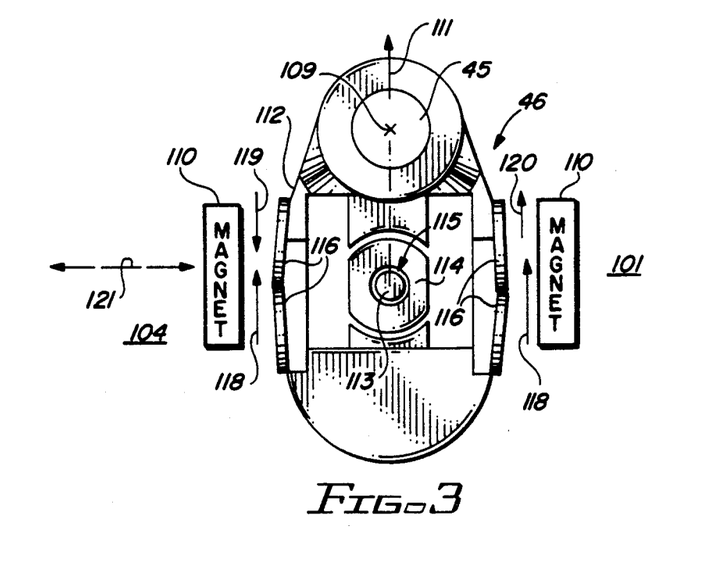
FIG. 3 is a simplified plan view of a rotary positioner of the FIG. 1 illustrated apparatus for illustrating effects of a bias force on the rotary positioner that counteracts gravity in one of three orientations of the rotary positioner.
Figure 4:
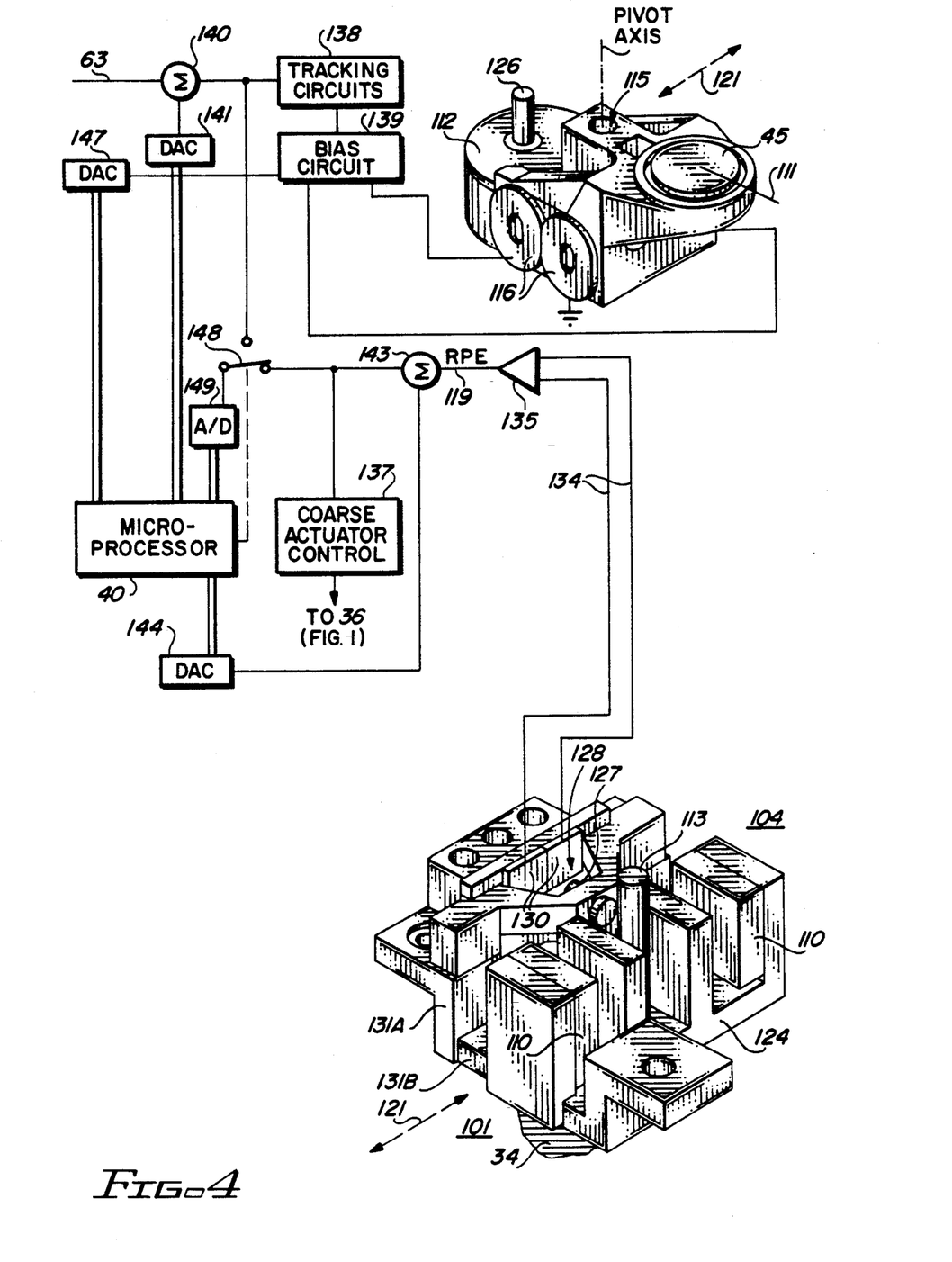
FIG. 4 is a combined block diagram and exploded view of mounting a rotary positioner on a carriage of the FIG. 1 illustrated apparatus for showing controls that effect automatic detection of orientation of the rotary positioner, hence the orientation of the FIG. 1 illustrated apparatus.

The momentary uncorrected position error of carriage 34 is also represented by the value of RPE error signal on line 119 of FIGS. 1 and 4 immediately after the carriage is momentarily urged to move independently of the rotary actuator. The amplitude variations of RPE error signal with changes in bias on rotary positioner 46 (see FIG. 3) is similar to the TES amplitude variations shown in FIG. 2. Accordingly, the RPE error signal amplitude variations also indicate physical orientation of the FIG. 1 illustrated apparatus. Either or both of the above described modes of orientation detection may be used in practicing the present invention.

FIG. 3 illustrates biasing the rotary positioner 46 for counteracting gravity to enable detection of drive or positioner 46 physical orientation. A pair of tracking coils 116 are disposed on opposite sides of the body 112. A pair of magnets 110 are mounted in an upstanding manner on head arm 34 (FIG. 4) to be in close magnetic association with the tracking coils 116. For some applications, a hardened tubular insert 114 mounted on body 112 forms a slide bearing about pivot pin 113 for enabling rotary positioner 46 to rotate about the pivot pin 113 and slide axially thereon about its pivot axis which is the center axis of pin 113. Because of the tight tolerances involved, any space 115 between pivot pin 113 and hardened insert 114 can cause unintended wobble or vibration of body 112 with respect to pivot pin 113. Also, the FIG. 1 illustrated apparatus, hence rotary positioner 46, may not always be mounted in a horizontal position. That is, the rotary positioner 46 may be vertically mounted so that pivot pin 113 is horizontal. The vertical orientation can be with either right side 101 up (pin 113 points right in FIG. 4) or left side 104 up (pivot pin 113 points left in FIG. 4). Such change in orientation can have significant changes in operation of rotary positioner 46. It is desired to minimize these changes in an inexpensive and effective manner.

Coils 116 not only imparting rotational motion to rotary positioner 46, but also to provide a bias magnetic field by a bias current flowing therethrough for producing the magnetic force indicated by arrows 118. Such magnetic force forces the body 112 in the direction of the arrows 118 for pressing the body 112 against pivot pin 113 at a point aligned with arrows 118. This bias force is aligned with arrow 111 and dissects the optical axis 109 of objective lens 45. Gravity, in the three physical orientations, affects the bias force differently. It has been found, if the bias force represented by arrows 118 counteract or balance out the gravitational effects, then the servo action becomes less stable, i.e. phase margin is reduced. The bias force, as shown in FIG. 2, is different for each of the three physical orientations. Therefore, detection of the servo instability, such as by detecting the uncorrected positional errors represented by the peak amplitudes shown in curves 100, 102 and 103 provide a reliable indication of drive orientation.

It should be noted that the bias magnetic force represented by arrows 118 is superposed upon the rotation-inducing magnetic forces 119 and 120 generated by tracking coils 116 and magnets 110 for effecting rotational motion of rotary positioner 46. The rotation inducing control electrical currents flowing through coils 116 operate to produce forces that are in the same rotational sense. That is, to rotate body 112 counterclockwise, a magnetic force represented by arrows 119 and 120 causes a torque reaction between the body 112 and magnets 110. For clockwise rotation, the magnetic forces represented by arrows 119 and 120 are reversed. In this regard, it should be noted that the bias magnetic force represented by arrows 118 are in opposite rotational senses, such that no rotational effect is imposed upon the rotary positioner 46. Superposing the rotational causing magnetic forces with the bias forces, effects a superposition of the forces for maintaining the bias force to effect contact between body 112 and pin 113 always along line 111. Therefore, as body 112 rotates, the biasing force follows the rotation as the body 112 rotates or pivots about pin 113. This arrangement maintains the biasing force for keeping the pin 113 and body 1120 together along line 111, whether it be on the side of pin 113 closest to lens 45 or on the opposite side is of no consequence. This arrangement also provides for a maximum balance in the rotary positioner 46. It is understood that the magnets 110 can be mounted on the rotary positioner 46 body 112 with the coils 116 mounted on carriage 34.

The winding direction of the coils 116 and the direction of currents flowing therein, determine the direction of rotation and the direction of bias forces produced. Since this relationship is understood and is a design matter, it is not further discussed.

FIG. 4 illustrates the relationship of the rotary positioner 46 on base support 131A, 131B. Base support portion 131B includes an E shaped upwardly-opening magnetically-permeable member 124 having upstanding arms supporting magnets 110, as shown. Upstanding arms 33 and 34 extend into apertures 18 of rotary positioner 46, respectively. Upstanding pivot pin 113 extends through tubular insert 114 (FIG. 3) for providing rotary and axially slidable support to rotary positioner 46. Rotary positioner 46 is movably portioned between the arms of member 124 for limited pivoting motions. Assembly of rotary positioner includes first mounting rotary positioner 46 on pivot pin 113 of base portion 131B (base portion 131A is not affixed to portion 131B at this time). Then, base portion 131A is attached to portion 131B such that upstanding pin flag 126 is disposed in cavity 128 of base portion 131A. Flag pin 126, as later described, is part of the RPE detector 56 of FIG. 1. The entire base 131A, 131B is then mounted on carriage 34.

Detector 56 includes a light emitting diode 127 mounted on base portion 131A for supplying a light beam toward a pair of photo sensing diodes 130. Cavity 128 disposed between light emitting diode 127 and photo sensing diodes 130 receives position indicating pin flag 126. Dashed line double headed arrow 121 indicates the radial direction of the disk 30, i.e. the path followed by carriage 34 and the radial motions of lens 45 in rotary positioner 46.

Figure 5:
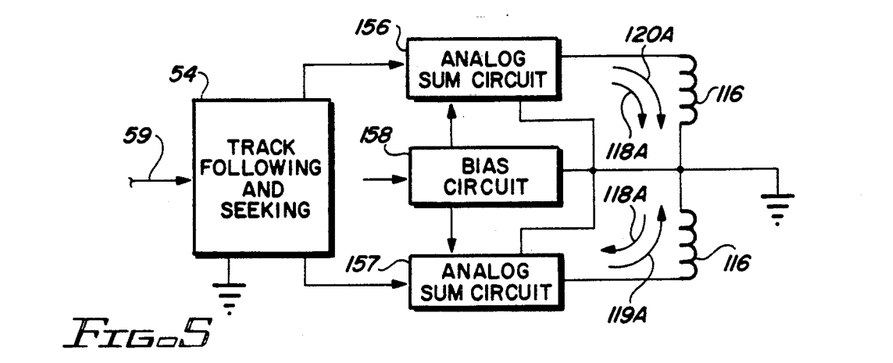
FIG. 5 is a circuit diagram of a bias force generating circuit shown in FIG. 4.

The block diagram portion of FIG. 4 illustrates the apparatus in the FIG. 1 illustrated apparatus that implements the present invention. Of course, some of the illustrated apparatus in FIG. 4 is used for purposes other than practicing the present invention. Microprocessor 40 controls the bias force on rotary positioner 46 via DAC 147 and bias circuit 139. The bias current may be a constant current, pulse width modulated current and like. Tracking circuits 138 supply torque inducing signals via bias circuit 139 to coils 116 of rotary positioner 46. FIG. 5, later described, illustrates combining the torque inducing signals with the bias force signals such that windings or coils 116 provide both rotary control of rotary positioner 46 and the gravity compensating bias force.

The RPE error signal is developed by photo diodes 130. Photo diodes 130 are connected via a pair of leads to two input connections of differential amplifier 135. Amplifier 35 is preferably mounted on frame 35 of FIG. 1. The output signal of differential amplifier is the RPE error signal on line 119 for indicating the rotation of rotary positioner 46. If pin 126 is aligned with the photo diodes, then the RPE error signal is zero. That is, rotary positioner 46 is at a reference rotational position that is a desired position during track following operations. As rotary positioner 46 leads or trails carriage 34 in motion, the RPE error signal becomes non-zero to indicate the rotational displacement of rotary positioner 46 from the reference position.

Usually RPE line 119 is connected directly to coarse actuator control 137 (a part of focus and tracking circuits 54 of FIG. 1). Actuator control 137 drives actuator 36 (FIG. 1). In accordance with the invention, summing circuit 142 is electrically interposed between differential amplifier 135 and actuator control 137. A momentary uncorrected positional error of carriage 34 is effected for each radial bias force on rotary actuator 46 to be used in testing for orientation. Microprocessor 40 sends a digital value to analog convertor (DAC) 144 to generate a perturbation in the RPE error signal that effects the momentary uncorrected motion. In one mode, microprocessor 40 actuates DAC 144 to emit a step function control to modify the RPE error signal value. In a second mode, microprocessor 40 actuates DAC 144 to generate an impulse or step signal modifying the RPE error signal. The modified or perturbed RPE error signal actuates coarse actuator 36 into a momentary uncorrected positional movement. At the point where gravity is compensated by the bias force on rotary positioner 46, this momentary uncorrected movement of the carriage 34 results in the tracking error signal TES on line 63 to have a substantial excursion as shown in FIG. 2. At all other bias forces that do not compensate for the effects of gravity, coarse actuator control 137 fully compensates for the momentary RPE error signal perturbation. Such servo accommodation of the RPE error signal perturbation is shown in FIG. 2 by the substantially horizontal portions of curves 100, 102 and 103.

To detect TES during and immediately after the momentary actuation of carriage 34, electronic switch 148 is switched to connect the output of summing circuit 140 to A/D 149. Summing circuit 140 passes TES on line 63 to tracking circuits 138 for effecting track following. Switch 148 couples TES to analog-to-digital convertor D/A 149 for digitization. A/D 149 supplies the digitized values to microprocessor 40 for analyzing TES as described with respect to FIG. 2. Such sampling and analysis uses known engineering design.

In the above described operations, microprocessor 40 first actuates DAC 147 to provide a bias force represented in FIG. 2 by hash marks 165, 173 or 176. Simultaneously, switch 148 is actuated by microprocessor 40 to effect the above described connections to A/D convertor 149. The sequence of operations is also described with respect to the flow chart in FIG. 6. Microprocessor 40 provides for runout compensation by actuating DAC 141 to alter the PES signal on line 63 via summer 140, as is known.

Similarly, switch 148 can connect the output of summer circuit 143 to A/D 149 for passing the RPE error signal to microprocessor 40. Microprocessor 40 after actuating DAC 144 to perturb the RPE error signal, coarse actuator control 137 responds for accommodating the DA 144 supplied perturbation. If the radial bias on rotary actuator 46 does not compensate for gravity, then the phase margin of control 137 (a positioning servo) is large resulting in a small, if any movement of carriage 34. Such lack of carriage motion results in an RPE error signal that quickly returns to its static value. This quick return indicates that the radial bias force is not compensating for gravity. A large momentary motion of carriage 34 indicates that the radial force is compensating for gravity effects in the rotary actuator. Such large momentary motion, a maximal motion, results in an amplitude excursion in the RPE error signal. The maximum RPE error signal amplitude excursion at a given bias force (there can be several tests of carriage 34 motions at diverse radial bias forces on the rotary actuator) indicates the physical orientation of the positioning system as explained with respect to FIG. 2.

FIG. 5 shows a detailed circuit that implements bias circuit 139 of FIG. 4. The coils 116 are arranged to produce a magnetic force as described above when the electrical current flowing there through for rotating the body 112 as indicated by the arrows 119 and 120 magnetic forces by currents 119A and 120A. The winding direction of the coils 116 and the direction of currents flowing therein, determine the direction of rotation and the direction of bias forces produced. Since this relationship is understood and is a design matter, it is not further discussed. Reversing the coil winding directions causes a reversal of current direction. In the FIG. 5 illustration, the current direction represented by arrows 119A and 120A, generates the oppositely directed magnetic forces 119 and 120 for effecting rotational torque on fine actuator 46. In contrast, to generate the bias magnetic forces, represented by arrows 118, the current flows in the same direction as represented by arrows 118A. The superposition of the electrical currents flow through the coils 116 from analog sum circuits 156 and 157, respectively. A track following and seeking circuit 54 receives control or command signals from microprocessor 40 over line 59. Circuit 54 supplies control signals through analog sum circuits 156 and 157, respectively, for the coils 116 for effecting rotation of the actuator 13. In contrast, bias circuit 158 is connected to coils 116 via the analog sum circuits 156 and 157, respectively, which causes superposition of the electrical currents in the coils 116.

Figure 6:
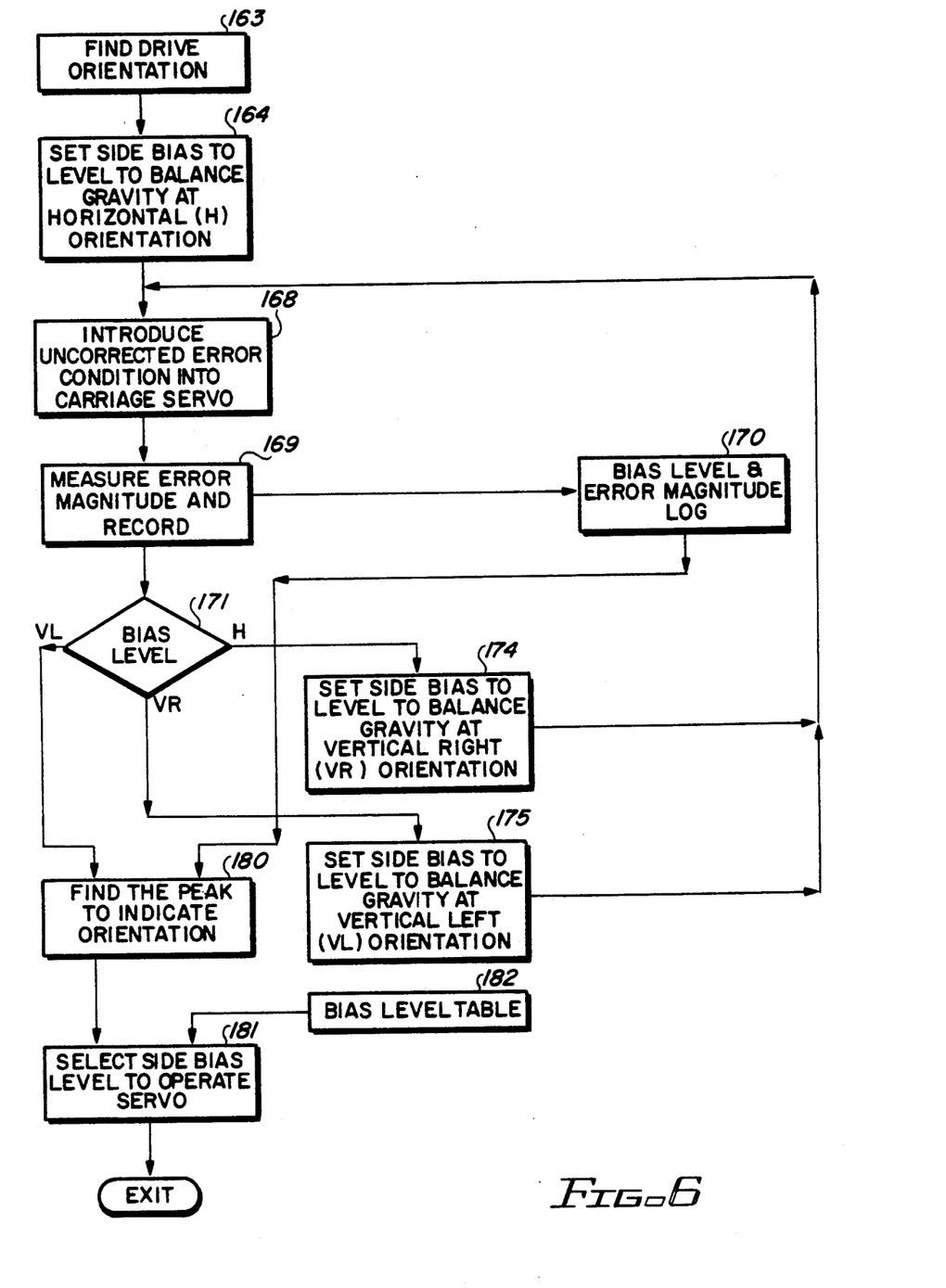
FIG. 6 is a flow chart showing a sequence of machine operations for effecting orientation detection of the FIG. 1 illustrated apparatus and the rotary positioner of FIG. 3.

Referring next to FIG. 6, the sequence of machine operations effected in the FIG. 1 illustrated apparatus for practicing the present invention are described. Microprocessor 40 is first activated in step 163 to find the orientation of the FIG. 1 illustrated apparatus. In step 163, microprocessor actuates switch 148 to connect summer 143 to A/D 149. The other position is for purposes of analyzing the output TES of summer 140. Microprocessor 40, via A/D 149 measures overshoot of carriage 34 by detecting the RPE error signal change during a momentary uncorrected motion of carriage 34. This uncorrected motion of carriage 34 indicates reduced phase margin in the servo control 137, hence indicates the radial bias force on fine actuator is balancing the effects of gravity thereby indicating orientation.

The sequence shown in FIG. 6 assumes that most optical disk apparatus are mounted in a horizontal orientation. Accordingly, at step 164, microprocessor 40 actuates DAC 147 to supply a bias signal represented by hash mark 165. Then, at step 168, microprocessor 40 supplies a set of digital values to DAC 144 for generating a pulse or step in the RPE error signal by summing circuit 143. Microprocessor 40 at step 169 reads a predetermined number of sampled values from A/D converter 149 and logs same in step 170 in RAM 42 for profiling the response of coarse actuator control 137 and carriage 34 to the amplitude perturbation in the RPE error signal. As shown, in FIG. 6, all orientations are tested before detecting and indicating drive orientation. In a shortened sequence, microprocessor 40 detects whether or not carriage 34 uncorrected motion occurred (a peak value is generated in the RPE error signal). If yes, the remaining measurements and analysis may be dispensed with. The continuing discussion is based on an assumption that all three orientations are to be examined before indicating drive orientation.

From step 169, microprocessor 40 in step 171 examines which orientation was tested. For horizontal orientation H, the sequence goes to step 174 for setting the "side" or gravity compensating bias for vertical right side up orientation. This setting corresponds to hash mark 173 of FIG. 2. Steps 168-171 are then repeated. At step 171, the VR (vertical right) test has been completed. The sequence proceeds to step 175 whereat microprocessor 40 sets the side or radial bias to a value represented by hash mark 176 for testing the vertical left orientation. Steps 168-171 are again repeated. This last iteration of testing completes the sequence. Microprocessor 40 exits step 171 at VL to execute step 180 to determine which of the three tests produced a peak in the RPE line 119 signal. The step 170 logged digital values are analyzed using known digital peak detecting procedures. The detected peak is indicate. At step 181 the orientation is used to select a prior determined side bias force from bias level table 182 (store in ROM 41 for example). That is, during the design of the FIG. 1 illustrated apparatus, testing was conducted for ascertaining the side bias level that is best suited for the three orientations. Since known engineering measurement techniques are employed, the empirical determination is not further described. Microprocessor 40 exits the sequence from step 181.

The above described sequence is equally applicable to forcing an uncorrected positional movement in carriage 34 and then measuring the effects on TES for finding the orientation of the FIG. 1 illustrated apparatus. Both sequences may be employed for determining orientation. Also, using both measurements in but one of the orientations, such as the first horizontal orientation examination, may be used. Other variations in testing sequences may also be employed.

While the invention has been particularly shown and described with reference to preferred embodiments thereof, it will be understood by those skilled in the art that various changes in form and details may be made therein without departing from the spirit and scope of the invention.

What is claimed is:

1. In apparatus for calibrating a positioning system, including, in combination:
   a frame;
   a work member having a work surface with a plurality of work lines;
   a rotary tool support means having a pivot axis substantially perpendicular to said work surface and having a work tool facing said works surface, said rotary tool support means being capable of working in any one of a plurality of physical orientations including rotary motions along vertical and horizontal oriented work surfaces;
   carriage support means movably mounted on the frame for reciprocating movements along a first linear path across the work surface and mounting the rotary tool support means for rotation about the pivot axis, said rotary tool support means having a distal end portion mounting said work tool for movements substantially along said first linear path, said carriage support means having a predetermined reference relative position for the rotary tool support means to be positioned on said carriage support means;
   stop lock servo means connected to the rotary tool support means and in an operative sensing relation to the work surface for indicating a relative motion along said first linear path of said rotary tool support means and said work surface from a predetermined stop lock position and having a TES error means for generating a TES position error signal representative of said relative motion;
   RPE error means connected between said rotary and carriage support means for sensing rotary relative motion between the rotary and carriage support means and supplying an RPE error signal indicating relative displacements of the rotary tool support means from said predetermined reference relative position for indicating said sensed rotary relative motions;
   carriage servo means operatively coupled to said carriage support means and to said RPE error means for responding to said RPE error signal to actuate the carriage support means to move in a direction for reducing said relative displacements such that the relative displacement of the rotary tool support means is at said reference relative position whereby the carriage support means follows the motions of said work tool along said first linear path,
   bias means connected to said rotary tool support means for mechanically biasing said rotary tool support means in a second direction orthogonal to said first linear path;
   orientation testing means connected to the bias means for actuating the bias means to supply one of a plurality of predetermined bias forces for mechanically biasing said rotary tool support means to balance any effects of gravity on the rotary tool support means only if the positioning system is oriented in respective ones of a plurality of physical orientations;
   said orientation testing means coupled to the biasing means and one of said error means and to said carriage support means for momentary urging one of said support means for a predetermined movement along said first linear path and for simultaneously actuating said biasing means to bias said rotary tool support means successively by each one of said plurality of bias forces for testing said positioning system to determine said physical orientation of said rotary tool support means; and analysis means for determining said physical orientation of said rotary tool support means and connected to one of said support means, to said RPE means and to said orientation testing means for responding to said orientation testing means momentary urging one of said support means at each respective one of said bias forces to sense any uncorrected movement of said carriage support means with respect to rotary relative movement of said rotary tool support means;

said analysis means having a peak detector for peak detecting said indicated rotary relative motion at each respective one of said plurality of bias forces;

orientation means in the analysis means for responding to said peak detecting indicating a first predetermined error indication peak at a first one of said bias forces for indicating that the rotary tool support means is physically oriented for horizontally oriented rotary motions along a horizontally oriented work surface.

2. In the apparatus set forth in claim 1 further including, in combination:

said first one of the support means being said rotary tool support means;

said orientation testing means actuating said carriage support means to momentarily move a predetermined distance along said first linear path; and said work tool being an objective lens, laser means optically coupled to said objective lens for supplying a laser beam to said work surface, said work surface reflecting said laser beam to said objective lens, error sensing means optically coupled to the objective lens for receiving said reflected laser beam and responding to said received reflected laser beam to indicate any displacement of said tool from a predetermined stop lock position, said analysis means being connected to the sensing means for receiving said displacement indication and if said displacement indication exceeds a predetermined value, then said analysis means indicating said first orientation.

3. In the apparatus set forth in claim 1, further including, in combination:

vertical means in said bias means for applying a second predetermined bias force to said rotary work tool support means that balances any effects of gravity when said rotary work tool support means is in a first predetermined vertical orientation.

4. In the apparatus set forth in claim 3, further including, in combination;

said vertical means having means for applying a bias force to said rotary work tool support means for either one of two vertical orientations.

5. In the apparatus set forth in claim 1, further including, in combination:

said first one of the support means being said carriage support means; and said work tool being an objective lens, laser means optically coupled to said objective lens for supplying a laser beam to said work surface, said work surface reflecting said laser beam to said objective lens, error sensing means optically coupled to the objective lens for receiving said reflected laser beam and responding to said received reflected laser beam to indicate any displacement of said tool from a predetermined stop lock position, said analysis means being connected to the sensing means for receiving said displacement indication and if said displacement indication exceeds a predetermined value, then said analysis means indicating said first orientation.

6. In the apparatus set forth in claim 1, further including, in combination:

said work tool being an objective lens;

said work member being a data storage member having data-storing tracks extending orthogonally to said first linear path;

laser means for shining a laser beam through said objective lens to said work surface to be reflected by said work surface to said objective lens;

detector means being optically coupled to the objective lens for receiving said reflected laser beam from said objective lens and connected to said TES error means for supplying signals thereto for actuating the TES error means for generating said TES position error signal indicative of displacement along said first linear path from a predetermined one of the tracks;

said stop lock servo means being track following means connected to said TES error means for receiving said TES position error signal and being responsive to the position error signal indicating a position error to actuate the rotary work tool support means to move back to the predetermined one of the tracks; and said bias means including electrical coils mounted on said rotary work tool support means for carrying electrical currents to apply said bias force to said rotary work tool support means and including magnet means on the carriage support means for reacting to electrical current induced magnetic fields to generate said applied bias force.

7. In the apparatus set forth in claim 6, further including, in combination:

said first one of the support means being said rotary tool support means; and said orientation testing means actuating said carriage support means to momentarily move a predetermined distance along said first linear path.

8. In the apparatus set forth in claim 6, further including, in combination:

said first one of the support means being said carriage support means; and said orientation testing means actuating said rotary tool support means to momentarily move said work tool a predetermined distance along said linear path.

9. In the apparatus set forth in claim 6, further including, in combination:

sequence means in the orientation testing means for indicating first and second modes for testing for orientation of the rotary work tool support means and for actuating the orientation testing means to first test using a one of the modes and then test using a second one of the modes:

said sequence means in said first mode measuring the motion of said rotary tool support means in response to the momentary urging of said carriage support means including measuring the amplitude of said TES position error signal; and said sequence means in said second mode measuring the measuring the motion of the carriage means in response to the momentary urging of said carriage support means including measuring the amplitude of said RPE error signal.

10. In the apparatus set forth in claim 6, further including, in combination:
vertical means in said bias means for applying a second predetermined bias force to said rotary work tool support means that balances any effects of gravity when said rotary work tool support means is in a first predetermined vertical orientation.

11. In the apparatus set forth in claim 6, further including, in combination:
said rotary tool support means moving away from said reference rotational position on said carriage support means;
said RPE error means detecting and indicating said rotational movement away from said reference rotational position, said RPE error means indicating the relative position of the rotary work tool support means with respect to the reference rotational position as an RPE error signal; and
said analysis means connected to the RPE error means for receiving said RPE error signal and for analyzing said RPE error signal for detecting a peak amplitude and responding to said detected peak amplitude to indicate orientation of said rotary work tool support means.

12. In the apparatus set forth in claim 11, further including, in combination:
said orientation testing means having sequence means for testing for one of said physical orientations in first and second orientation testing modes;
in said first testing mode, said orientation testing means actuating said carriage support means to momentarily move in an uncorrected motion and substantially simultaneously sensing said TES position error signal for an uncorrected error condition;
in said second testing mode, said orientation testing means actuating said carriage support means to momentarily move in an uncorrected motion and substantially simultaneously sensing said RPE error signal for a peak amplitude; and
said analysis means being responsive to said peak detector while said orientation testing means is in one of said modes indicating either a peak amplitude or no peak amplitude to indicate physical orientation of rotary tool support means.

13. In the apparatus set forth in claim 1, further including, in combination:
a programmed microprocessor having programs that include said orientation testing means and said analysis means;
a first digital to analog converter having a digital input connected to said microprocessor and an analog output connected to the bias means for supplying a signal to the bias means for actuating same to apply said first predetermined bias force;
a second digital to analog convertor having a digital input connected to said microprocessor and an analog output connected to said one of said servo means for introducing said momentary amplitude perturbation in said RPE error signal for actuating said carriage support means into an uncorrected momentary movement; and
an analog to digital convertor connected to said servo means that actuates a second one of said support means for receiving one of said error signals therefrom that indicates an uncorrected error condition and having a digital output connected to the microprocessor to supply digital values thereto indicating said uncorrected error condition.

14. In the apparatus set forth in claim 13, further including, in combination:
an electronic switch having a common and two switched terminals, said common terminal being connected to said analog to digital converter and said switched terminals being connected respectively to said TES error means and to said RPE error means for receiving said TES and RPE error signals; and
said microprocessor being connected to the electronic switch for connecting a one of the switched terminals to said common terminal.

15. In the apparatus set forth in claim 1, further including, in combination;
said analysis means having a table of desired bias forces for each of a plurality of said orientations; and
said analysis means having selection means responsive to an indicated orientation to actuate the bias means to use one of the desired bias forces for said indicated orientation.

* * * * *

UNITED STATES PATENT AND TRADEMARK OFFICE
CERTIFICATE OF CORRECTION

PATENT NO.   :   5,289,319
DATED        :   February 22, 1994
INVENTOR(S)  :   Enrique E. Aviles, et al.

It is certified that error appears in the above-identified patent and that said Letters Patent is hereby corrected as shown below:

At column 12, line 5, the word "works" should be --work--; at line 31, the word "motion" should be --motions--.

Signed and Sealed this

Twenty-eighth Day of June, 1994

Attest:

BRUCE LEHMAN

Attesting Officer

Commissioner of Patents and Trademarks